Feb. 22, 1944.   N. L. DAHLANDER   2,342,455
CHAIN NET
Filed June 10, 1942   2 Sheets-Sheet 2
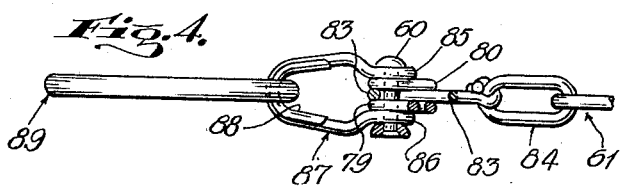
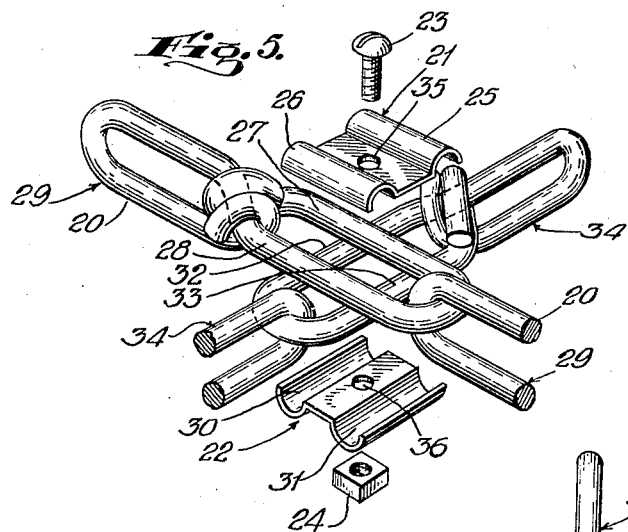
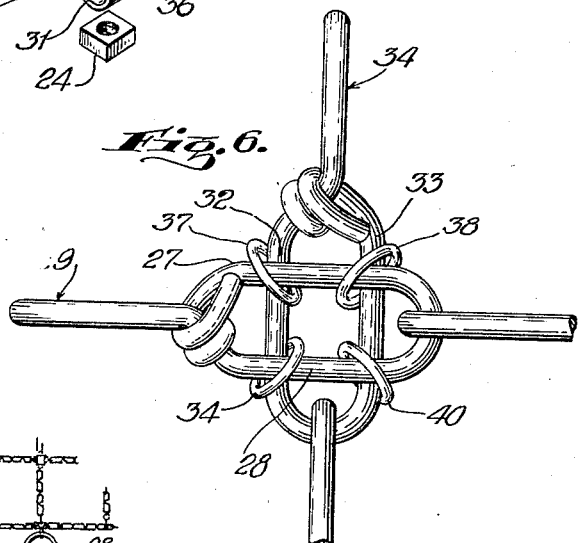
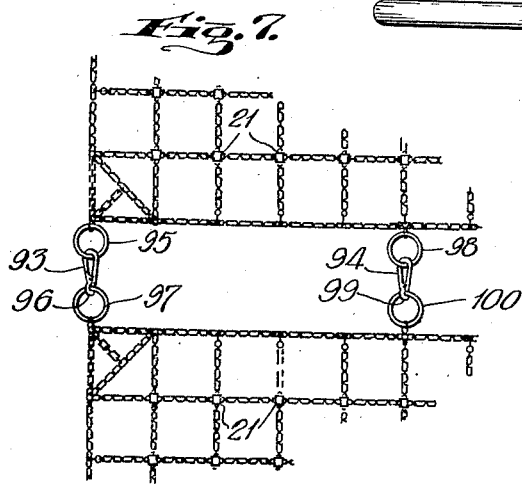
INVENTOR
NOËL L. DAHLANDER
BY
ATTORNEY Patented Feb. 22, 1944

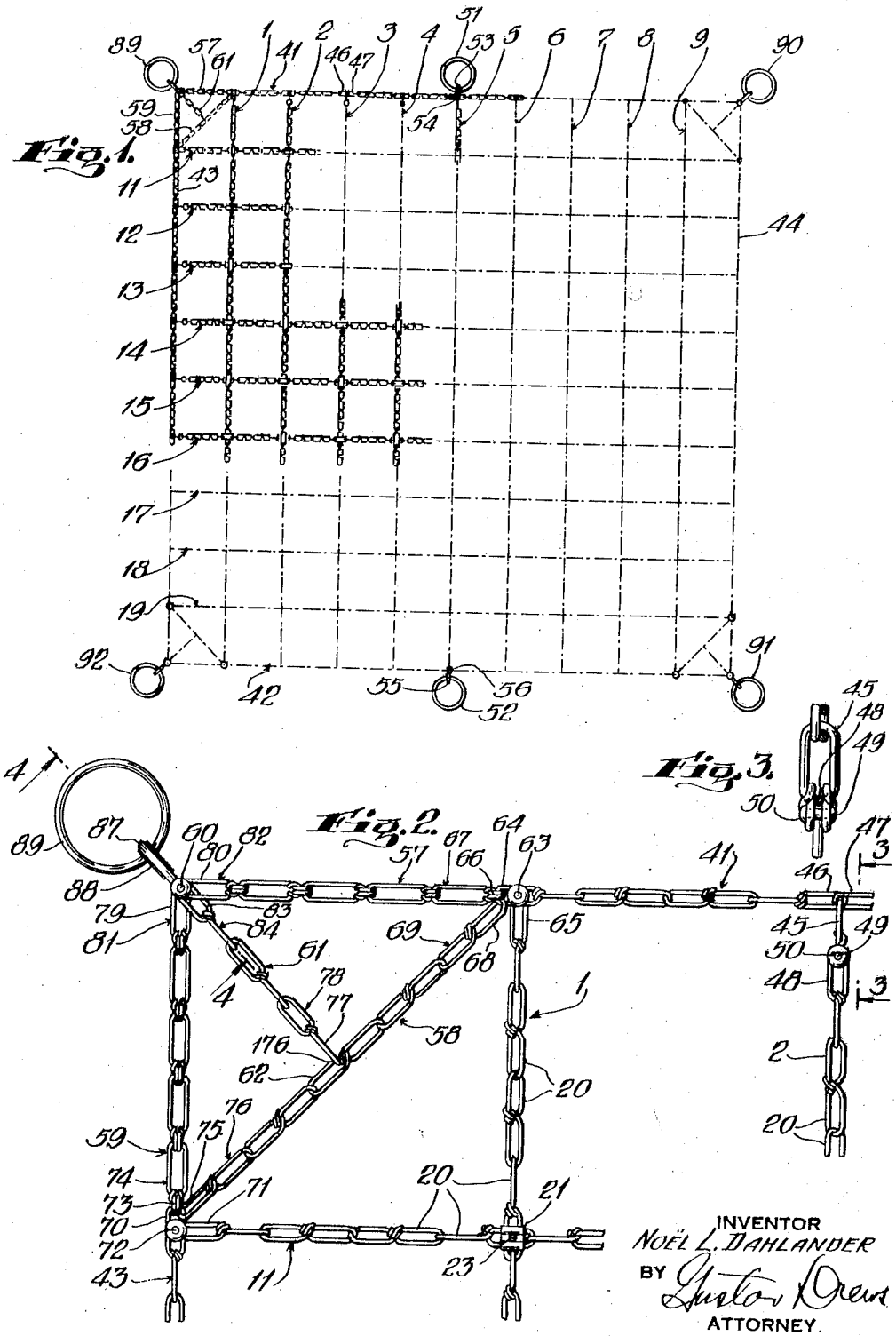

2,342,455

UNITED STATES PATENT OFFICE 2,342,455

CHAIN NET

Noël L. Dahlander, New York, N. Y., assignor of two-fifths to Robert J. Earl, New Canaan, Conn.

Application June 10, 1942, Serial No. 446,485

8 Claims. (Cl. 294—77)

This invention relates to cargo nets in general and more especially to chain nets which can be used not only for transferring cargoes but also used for disembarking passengers and troops from passenger vessels, transports and the like in the case of an emergency or otherwise.

Among the objects of the present invention it is aimed to provide an improved cargo net composed of chain links which is not only much lighter in weight than nets composed of manila rope of like size and suitable for like service, but which requires much less space when stored or packed on the deck of a vessel either flat, folded or rolled.

More specifically, it is aimed to provide an improved arrangement of metal chains to form a cargo net, to provide an improved means for connecting the cross chains of a cargo net to one another, and to provide an improved arrangement for connecting the intermediate chains of a cargo net to the border chains.

These and other features, capabilities and advantages of the invention will appear from the subjoined detail description of specific embodiments thereof illustrated in the accompanying drawings in which Figure 1 is a fragmental plan of a chain cargo net made according to one embodiment.

Fig. 2 is a fragmental plan showing one corner of the embodiment illustrated in Fig. 1.

Fig. 3 is a section on the line 3—3 of Fig. 2, enlarged with regard to the scale of Fig. 2.

Fig. 4 is a section on the line 4—4 of Fig. 2 enlarged with regard to the scale of Fig. 2.

Fig. 5 is an enlarged fragmental exploded perspective showing the means for connecting the cross chains shown in Figs. 1 and 2 on the scale shown in Fig. 4.

Fig. 6 is a fragmental plan showing another means for connecting the cross chains on the scale shown in Fig. 4.

Fig. 7 is a fragmental detail showing the means for connecting adjacent cargo nets to one another shown on the scale of Fig. 1.

In the embodiment shown in Figs. 1 to 5, inclusive, there is illustrated a cargo net composed of one set of parallel intermediate chains 1 to 9, inclusive, which for the purpose of this description will be known as the longitudinal chains, and another set of parallel intermediate chains 11 to 19 which for the purpose of this description will be known as the transverse chains to distinguish from the chains 1 to 9, inclusive.

Preferably both of these sets of chains are composed of links 20 known as "Tenso Pattern" or "Tenso" links. These transverse and longitudinal chains preferably cross one another to form a basket-weave in which, as an instance, the chain 1 passes over the chain 11 then under the chain 12 and so on alternately in staggered relation to the chain 2, which initially passes under the chain 11, then over the chain 12 and so on alternately, while the chain 11 in turn after passing under the chain 1, next passes over the chain 2 and so on alternately in staggered relation to the chain 12, which initially passes over the chain 1, next under the chain 2 and so on alternately.

Where the chains 1 to 9, inclusive, cross the chains 11 to 19, inclusive, they are preferably connected to one another. According to the embodiment illustrated in Figs. 1 to 5, inclusive, this connection consists initially of two grooved plates 21 and 22 which are connected to one another by a screw and nut, see as an instance the screw 23 and nut 24 in Fig. 5. The plate 21 is povided with two parallel grooves or depressions 25 and 26 spaced from one another to register with and receive the shank portions 27 and 28 of the link 29 of one of the transverse chains and the plate 22 is provided with the two parallel grooves or depressions 30 and 31 to register with and receive the shank portions 32 and 33 of the link 34 of one of the longitudinal chains. The plates 21 and 22 intermediate their grooves, are also provided with the openings 35 and 36 respectively to receive the shank or stem of the screw 23, the nut 24 being obviously secured in place on the screw 23 after the stem of the latter has passed first through the opening 35, then between the shank portions 27 and 28 of the link 29, then between the shank portions 32 and 33 of the link 34, and then through the opening 36, with the shank portions 27 and 28 resting in the grooves 25 and 26, the shank portions 32 and 33 in the grooves 30 and 31 respectively and the shank portions 27 and 28 at substantial right angles to the shank portions 32 and 33 respectively. In some instances, it may be desirable not to clamp the links 29 and 34 against movement relative to one another but instead thereof to allow some movement relative to one another, when the plates 21 and 22 will merely serve as an anchoring means to maintain the shank portions 27 and 28 of the link 29 in engagement with the shank portions 32 and 33 of the link 34. On the other hand, when it is desired to anchor the links 29 and 34 against movement relative to one another it is only necessary to screw the nut 24 tight onto the screw 23 so that the plates 21 and 22 will frictionally clamp the links 29 and 34 against movement.

In the embodiment shown in Fig. 6, instead of the plates 21 and 22 for anchoring the links 29 and 34 to one another, there are provided a plurality of rings, preferably four in number such as the rings 37, 38, 39, and 40. The ring 37 passes over the shank portion 27 and under the shank portion 32, the ring 38 passes over the shank portion 27 and under the shank portion 33, the ring 39 passes over the shank portion 28 and under the shank portion 32, and the ring 40 passes over the shank portion 28 and under the shank portion 33, all as shown in Fig. 6. By means of this ring connection, there is of course considerable movement between the links 29 and 34 relative to one another although anchoring the shank portions 27 and 28 to move adjacent to the shank portions 32 and 33.

With the lateral movement permissible by the rings 37 to 40, inclusive, the greatest efficiency of course can be obtained from the basket-weave of the transverse and longitudinal chains so that the weight supported by any chain portion will always be distributed onto at least two other chain portions extending at right angles thereto.

There are also provided border chains 41 and 42 extending parallel to the chains 11 to 19, inclusive, and border chains 43 and 44 extending parallel to the chains 1 to 9, inclusive. The chains 41 and 42 are preferably composed of links of the type known as "Tenso Pattern" or "Tenso" and extend from the chains 1 to 9. Similarly the chains 43 and 44 are preferably composed of links of the type known as "Tenso Pattern" or "Tenso" and extend from the chains 11 to 19.

These chains 41 to 44, inclusive, are connected to the chains 1 to 9, inclusive, and 11 to 19 in the manner now to be described. The chain 41 is preferably connected to the ends of the chains 2 to 8, inclusive, by means of a link known as a "Lock Link," see the link 45. The free ends of this link are preferably initially spread apart and then passed through two adjoining loops 46 and 47 of "Tenso" links of the chain 41, as shown in Fig. 2, and then the loops at the free ends of the link 45 extended to register with the loop 48 of the "Tenso" link at the end of a chain 2. Thereupon a rivet is passed through the registering loops of the links 45 and 48, such as the rivet 49, and then riveted down on the washer 50 in the well known manner. In a similar manner the chain 42 is connected to the chains 2 to 8, inclusive, the chain 43 to the chains 12 to 18, inclusive, and the chain 44 to the chains 12 to 18, inclusive. The intermediate fastening rings to receive lashings and the like such as the rings 51 and 52 are preferably connected to the border chains 41 and 42 respectively by links of the type known as the "Lock Link" such as the link 45. In the present instance the ring 51 is connected to the border chain 41 where it is connected to the longitudinal chain 5. For connecting the ring 51 to the chain 41 at this point, there is provided the "Lock Link" 53 which extends through the ring 51 and has its looped ends spread apart to receive adjacent loops of links of the chain 41 so that a rivet such as the rivet 54 may pass through the free loops of the link 53 and through the adjacent loops of the links of the chain 41 and secured in place in the manner shown for securing the rivet 49 in place in Fig. 3. The ring 52 is preferably as shown connected to the chain 42 at the lower end of the longitudinal chain 5 by a link 55 such as the link 53 and by a rivet 56 in the manner described with regard to the rivet 49, shown in detail in Fig. 3.

The four diagonal corners of the net shown in Fig. 1 on account of the extra strain exercised on the same have a particular construction, that now to be described. Since each of the corners is identical in construction it will be considered to suffice to describe but one of them, the one in the upper left hand corner of Fig. 1 and shown on a large scale in Fig. 2. The adjacent ends of the chains 1 and 41 are connected to an adjacent end of the border chain portion 57 and an adjacent end of the diagonal interconnecting chain 58. In turn the adjacent ends of the chains 11 and 43 are connected to an end of the border chain 59 and the other end of the diagonal interconnecting chain 58. The adjacent ends of the corner border chains 57 and 59 are not only connected to one another by the rivet 60 but also connected to an end of the short interconnecting link 61 the other end of which is connected to the link 62 of the interconnecting chain 58. The chains 58 and 61 are composed of links of the "Tenso" type while the chains 57 and 59 are composed of links of the "Lock Link" type. The connection between the chains 1, 41, 57 and 58 consists of a rivet 63 which extends through the overlapping loops 64 and 65 of the "Tenso" links at the ends of the chains 41 and 1, respectively. The so connected loop 64 is engaged by the looped end 66 of the link 67 of the chain 57. This loop 64 also receives the loop 68 of the "Tenso" link 69 of the chain 58. The rivet 63 is similar in form and construction to the rivet 49 provided with a suitable washer at one end thereof.

In turn the overlapping loops 70 and 71 of the "Tenso" links at the adjacent ends of the chains 43 and 11 are connected to one another by a similar rivet 72. This loop 70 in turn is connected to the looped end 73 of the link 74 of the chain 59 and also engaged by the loop 75 of the "Tenso" link 76 of the chain 58. The loop 176 of the link 62 is engaged by the loop 77 of the link 78 to connect the chains 58 and 61 to one another. The overlapping loops 79 and 80 of the links 81 and 82 of the chains 59 and 57, respectively, also overlap the loop 83 of the link 84 of the chain 61 and are connected to one another by the rivet 60, see Fig. 4, the stem of which not only extends through the overlapping loops 79, 80 and 83 but also through the looped ends 85 and 86 of the link 87. The link 87 is of the "Lock Link" type, and the ends 85 and 86 are spread apart to receive the overlapping loops 80, 83 and 79. Preferably the inner face of the main loop of the link 87 has a shield or thimble 88 to reinforce it against wear, the corner ring 89 passing through the main loop of the link 87 and engaging the shield 88 in use.

As aforesaid, the corner rings 90, 91 and 92 are secured to their respective corners by a chain arrangement substantially identical to that illustrated and described with regard to the corner ring 89.

These chain nets are constructed in sizes that are standard according to specifications of the Navy Department being, 14 by 14 feet, 12 by 12 feet, and 10 by 10 feet. In sizes of this type, when the nets are used for disembarking passengers and troops from the upper deck of one of the larger vessels, obviously a single net would not be sufficient. In such cases, several nets are connected to one another by means of snap links such as the snap links 93 and 94 shown in Fig. 7, the snap link 93 having its main loop engaging as an instance the corner ring 95, and its rigid small loop 96 engaging the corner ring 97. In turn the snap link 94 has its main loop engaging the intermediate ring 98 and the rigid small loop 99 engaging the intermediate ring 100. It is of course assumed that the rings 98 and 100 are connected to the middle of the net as described with regard to rings 51 and 52 and that the corner rings 95 and 97 are connected to the corners of the nets in the manner described with regard to the ring 89.

It is obvious that various changes and modifications may be made to the details of construction without departing from the general spirit of the invention as set forth in the appended claims.

I claim:

1. The combination of a chain net composed of two sets of parallel metal chains, one set extending at substantial right angles to the other set when stretched out and in staggered relation to one another so that of each two adjacent parallel portions of parallel chains, one will pass under a crossing chain and the other will pass over the same crossing chain, pairs of grooved plates, one of each pair engaging the link of the chain of one set and the other of each pair engaging the link of the chain of the other set where they cross, and a single screw and nut for securing the plates of each set in intimate engagement with the links so engaged but facilitating rotatable or angular movement of the plates relative to one another in substantially parallel planes.

2. The combination of a chain net composed of two sets of parallel metal chains, one set extending at substantial right angles to the other set when stretched out and in staggered relation to one another so that of each two adjacent parallel portions of parallel chains, one will pass under a crossing chain and the other will pass over the same crossing chain, and opposing grooved plates for engaging the overlapping links of the chains where they cross, and adjustable means extending from one plate to the other and including a single shank passing through the link of the chain of one set and through the link of the chain of the other set where they cross to anchor the crossing chains to one another where they cross with a predetermined amount of rotatable or angular movement relative to one another in substantially parallel planes when desired.

3. The combination of a chain net composed of two sets of parallel metal chains composed in turn of "Tenso" links, one set extending at substantial right angles to the other set when stretched out and in staggered relation to one another so that of each two adjacent parallel links of parallel chains, one will pass under a link of a crossing chain and the other will pass over a link of the same crossing chain, and metal rings, each passing through the link of the chain of one set and through the link of the other set where they cross to anchor the same to one another where they cross.

4. The combination of a chain net composed of two sets of parallel metal chains, one set extending at substantial right angles to the other set when stretched out, with the chains of each set alternately extending over and under successive chains of the other set to form a basket weave, means for connecting the chains of one set to the chains of the other set where they cross one another, and means including snap links connected to the edges of said net for securing the net to the edges of an adjacent net to form an extended net pattern.

5. The combination of a chain net composed of two sets of parallel metal chains, one set extending at substantial right angles to the other set when stretched out and in staggered relation to one another so that of each two adjacent parallel portions of parallel chains, one will pass under a crossing chain and the other will pass over the same crossing chain, border forming chains connected to the free ends of said parallel sets of chains, and means including snap links connected to the rings of border forming chains to connect the net to an adjacent border forming chain of an adjacent net to form an extended net pattern.

6. The combination of a plurality of metal chain nets, each net composed of two sets of parallel metal chains, one set extending at substantial right angles to the other set when stretched out and in staggered relation to one another so that of each two adjacent parallel links of parallel chains, one will pass under a link of a crossing chain and the other will pass over a link of the same crossing chain, metal anchoring means for connecting the links of the chains of one set to the links of the chains of the other set where they cross one another, border forming chains connected to the free ends of said parallel sets of chains, metal lash receiving rings connected to said border forming chains, and snap links connected to the rings of the adjacent border forming chains of any two chain nets to form an extended net pattern.

7. The combination of a chain net composed of two sets of parallel metal chains, one set extending at substantial right angles to the other set when stretched out and in staggered relation to one another so that of each two adjacent parallel portions of parallel chains, one will pass under a crossing chain and the other will pass over the same crossing chain, metal anchoring means for connecting the chains of one set to the chains of the other set where they cross one another, corner forming chain portions each consisting of two border forming chains two of the ends of which are connected to one another to form a corner, a diagonal interconnecting chain connecting the other ends of said border forming chains, a short interconnecting chain connecting the middle of said diagonal interconnecting chain with the connection at the corner between said border forming chains, a lash receiving ring, and a metal link for connecting said ring to said border forming chains at the corner formed thereby.

8. The combination of a chain net composed of two sets of parallel metal chains, one set extending at substantial right angles to the other set when stretched out and in staggered relation to one another so that of each two adjacent parallel portions of parallel chains, one will pass under a crossing chain and the other will pass over the same crossing chain, metal anchoring means for connecting the chains of one set to the chains of the other set where they cross one another, corner forming portions each composed of links of the "lock link" type and consisting of two border forming chains for each corner, two of the ends of which overlap to form a corner, a diagonal interconnecting chain composed of "Tenso" links connecting the other ends of said border forming chains, a short interconnecting chain composed of "Tenso" links and connected to the middle of said diagonal interconnecting chain, a lash receiving ring, a link of the "lock link" type, and a rivet extending through the looped ends of said latter link and the adjacent overlapping loops not only of the corner forming chains but also of the loop at the outer end of said short interconnecting chain and secured in place.

NOËL L. DAHLANDER.